E. VINCENZI.
Railroad-Car Telegraph.
No. 40,373.
Patented Oct. 20, 1863.
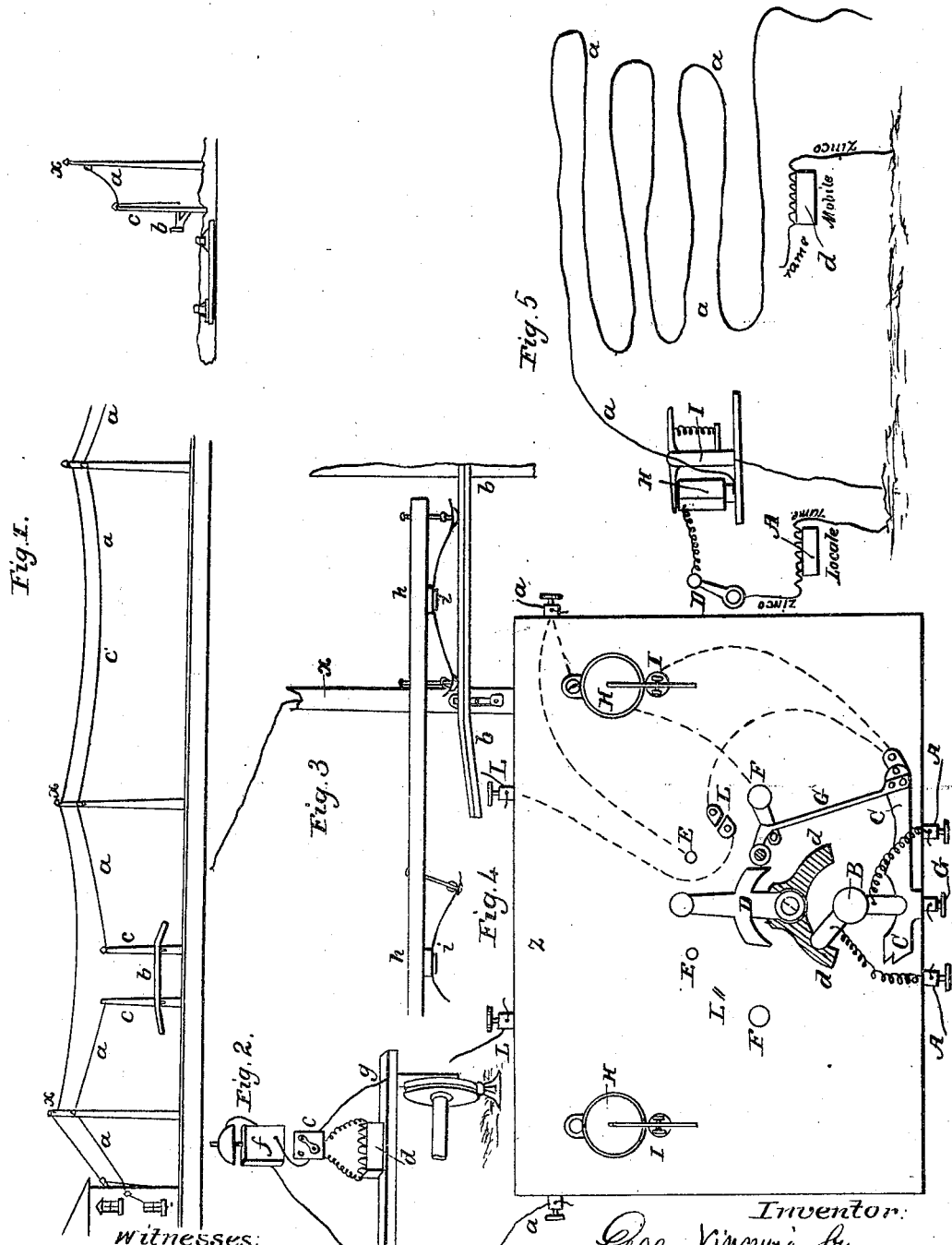

UNITED STATES PATENT OFFICE.

EUGENE VINCENZI, OF PARMA, ITALY.

IMPROVEMENT IN SIGNAL APPARATUS FOR RAILWAYS.

Specification forming part of Letters Patent No. 40,373, dated October 20, 1863.

*To all whom it may concern:*

Be it known that I, EUGENE VINCENZI, of Parma, in Italy, lieutenant of artillery, have invented certain new and useful Improvements in Apparatus for Signaling on Railways by Means of Electricity; and I hereby declare that the following is a full, clear, and exact description of the same, reference being had to the accompanying drawings, and to the letters and figures marked thereon—that is to say:

The object of this invention is to signal on railways by means of electricity with a view to the prevention of accidents; and the nature or principle of the invention consists in arranging and combining apparatus for that purpose, in which a conducting-wire is used to bring together or effect a meeting between the currents from the positive poles of two batteries, (one of which I herein call the "local" battery and the other the "traveling" battery,) the respective negative poles of which batteries communicate with earth, by which means an alarm furnished with electrical detent and situated in the circuit of the negative pole of the traveling battery is caused to remain silent. But the apparatus is so arranged that the action of the local battery may be instantaneously interrupted when required, and the aforesaid conducting-wire, which had hitherto opposed the current from the local battery to that from the traveling battery, becomes a conductor to earth from the positive pole of the traveling battery, and the circuit being closed, the alarm included therein is caused to sound, and this alarm, being placed on a locomotive or other convenient part of a train, will consequently call the engine-driver's attention in case of danger.

Having thus broadly set forth the general nature of the invention, I proceed to describe the best means known to me for carrying the same into practical effect.

Arms, bars, rods, or pieces communicating with a conducting-wire are placed at intervals along the line in such position that when a train passes them they come in contact with a spring carried on the locomotive or any convenient part of such train, which train also carries an alarm, and electric currents are so transmitted that when there is no danger the alarm is silent and when there is danger the alarm sounds. Thus the rods or pieces on the line, which I call "signal-rods," receive a current of electricity from the conducting-wire, which I call a "signal-wire," and which communicates with a galvanic battery at the station, which I call the "local" or "station" battery. The spring on the train, which I call a "signal" or "contact" spring, also receives a current of electricity from a battery on the train, herein called the "traveling" battery. As long as the currents sent into the signal-rods and contact-springs proceed from similar poles of their respective batteries, then when they come in contact the alarm will be silent; but if danger be apprehended, one of the currents is sent from a dissimilar pole, so that when the signal-rod and contact-spring come in contact the alarm will sound.

The signal-rods are supported on posts, and the alarm is provided with an electric detent. Now, suppose the signal rods receive by means of a signal-wire a current from the zinc pole of the local battery situated at the station whereof the copper pole communicates with earth, while the contact-springs receive a current from the zinc pole of the traveling battery, whereof the copper pole communicates with earth, (the alarm or bell being between the signal or contact springs and the traveling battery,) then, on a rod and spring coming in contact, the currents of the two batteries will be neutralized and the alarm silent; but if an attendant, by means of a communicator, changes the poles of one of the transmitted currents, then when a spring comes in contact with a rod a circuit will be formed and the alarm sounded.

I prefer to use sending-instruments and commutators with needles or handles so arranged that stations may signal to each other when trains leave and may change the pole as required. Sometimes a two-element local or station battery and a traveling battery with more elements—say six—are used, so that if all the signal-springs of the down trains were connected with one pole and the stations they pass sent their currents into the signal-wire from a like pole, while the up trains' signal-springs were connected with the opposite pole and the stations they pass send corresponding currents into the signal-wires, then, if two trains were in danger of coming in collision, the alarm of the one would sound on its spring coming in contact with the oppositely-charged rod. Or, the station attendant, if apprehending danger, could form a circuit between the two station-batteries by the signal-wire; but the train-batteries being much stronger than the station ones, then, on a train coming against a signal-rod, the current would extend to the signal-wire, forming circuit with the battery between the two stations having a corresponding pole, and if two trains came at the same time in contact with the signal apparatus, the circuit would be formed between the two traveling batteries and the alarms would sound. Or, I may use, say, a six-element station or local battery, and place on the train, instead of a battery, a compass with magnetic needle to indicate the trains' direction; and to warn a train in this case by a signal from the station the current is transmitted to the line-wire, and as soon as the spring touches the first signal-rod the current will flow to earth through compass alarm and wheels, causing the alarm to sound. Also, if the battery on the train is used and a compass placed at the station instead of the local battery, then by the deviation of the compass-needle the direction of the coming trains can be ascertained.

To warn two trains in danger of collision, I sometimes place in the circuit, between line or signal wire and sending or transmitting instrument, a coil which, when acted on by the current, attracts a lever which, in changing its position, is thrown into communication with any point going to earth. If a train leaving No. 1 station is in danger of collision from a train leaving No. 2 station, the currents being arranged as before explained, No. 2 train, on touching the signal-rod, will form circuit with No. 1 station, and the coil will move the lever which will form circuit with earth and the alarm will sound, and No. 1 train, on reaching a signal-arm, will have its alarm sounded also.

The accompanying drawings exemplify the manner in which the invention may be performed.

Figure 1 shows the arrangements to be adopted on the line, and Fig. 2 those to be adopted on the locomotive for carrying out the invention.

$a$ is a wire, which I call the "signal-wire," and by means of which each station is connected to the two nearest stations. This wire is supported on the ordinary telegraph-posts $x$.

$b$ is an iron rod, herein called "signal-rod," of which there is one at certain intervals along the line—say at every three-fifths of a mile. Each rod $b$ is supported on a pair of posts, $c$, and placed in a horizontal position parallel to and a short distance from the rails, and at the same height from the ground as the frame-work of a locomotive. The rod $b$, which is connected with the signal-wire, is the means whereby contact is obtained with trains traveling along the line.

On the locomotive of every train are placed a galvanic battery, $d$, and an alarm, $f$. The poles of this battery $d$, which is the traveling battery, are connected with a commutator, $e$, by means of which one pole is connected with earth, the conductor passing to earth through the wheels $g$ of the locomotive. The other pole of the battery is connected by the wire of a coil in the alarm $f$ with three steel springs, $i$, fitted at the side of the locomotive, on the frame-work $h$.

The springs $i$, hereinafter called "contact" springs, are so placed that when the locomotive is passing the signal-rod $b$ they come in frictional contact with those rods, as shown at Fig. 3, and thus contact is formed between the locomotive and the arrangements on the line, by which means, as hereinafter explained, signals may be produced by causing the alarm $f$ to sound, the magnetic action in its coil working the detent when required.

Fig. 4 shows the arrangements to be adopted at the station for carrying out the invention.

At each station is an instrument, $z$, to which are attached the ends of the signal-wire $a$.

A is a battery, placed at the station, and herein called the "local" or "station" battery. The poles of this battery are connected with a commutator, B, by means of which one of the currents passes to earth through C and the other to a sending appliance, key, handle, or pointer, D, which directs the current to one or other of the two signal-wires $a$.

In the apparatus $z$ are included the wires of the local battery A, a metal plate, C, connected to earth by a wire, $c$, a metal plate, $d'$, in contact with the handle D, and a metal stud, E, to which the wire $a$ is directly connected. The ends of the wires $a$ are connected to similar apparatuses at the two nearest stations.

F is a metal stud in communication with earth through a spring, G, and with the signal-wire $a$ through a coil, H. On the handle D is a curved or segmental piece, whereby, when the handle is moved, the spring G is moved away from its stop, and communication between the stud F and the earth will be consequently interrupted.

H are relay-coils for receiving the signals sent from the nearest stations, as also signals from trains on the line. This coil differs somewhat from the others, to adapt it for this twofold object, for which purpose only one part of it projects—namely, the outer end of its wire—whereas the inner end of its wire is soldered to the iron axle of its armature, which axle hence becomes magnetized when the current passes and is itself converted into a conductor. I is a two-armed piece, lever, or armature of iron, which is attracted by the coil H when a current passes. It is connected with earth through its supporting frame-work, as shown in Fig. 5. When a current is sent along the signal-wire $a$ from the battery at the next station the piece I acts as a tremulous or vibrating alarm; but if the current is sent from the local battery A by the handle D the piece I will be kept continuously attracted, because while the current is circulating through the coil it keeps up magnetic action in the axle, and when it reaches the inner or soldered end of the wire it escapes to earth through the piece I and its support.

L is a break in the continuity of the wire, one part of which proceeds from an iron rod which is fixed in front of the station, and is similar to the signal-rod $b$. When a train stops at the station the locomotive will come in contact with this rod by its springs $i$, as shown in Fig. 3, and so remain while awaiting a signal to set off, which signal will be given by the station-master, who, for that purpose, has only to bring the handle D to the part L, so that the current from the traveling battery $d$ shall complete the circuit from the springs to the rod, and thence to earth by the conjoined wire.

Now, suppose that all the trains starting from the central station and traveling toward the ends of the line have the copper pole of their traveling battery in connection with the contact-springs $i$, while, at the same time, the current is sent from the copper pole of the local or station battery along the wire $a$, but all the trains traveling from the ends of the line toward the central station have the zinc pole of their batteries in communication with the contact-springs $i$, and at the same time the local or station batteries send the zinc current along the wire $a$. Now, matters being so arranged, suppose a train is to be sent in a direction toward the end of the line. Then, before the train starts, a signal should first be sent to the next station which the train is to pass, and for this purpose the handle D is deflected or moved against the stud E, and the current thereby sent to the station passing to earth through the corresponding coil, where it sets going the tremulous alarm, and thereby calling the attendant's attention. When this is done the handle D is brought straight again and connection reproduced between the signal-wire $a$ and earth, which had been interrupted when D was against the stud E. The station addressed should immediately reply, the attendant there proceeding as just explained, except that, instead of bringing the handle D quite straight, he leaves it somewhat deflective, so that the connection between the wire $a$ and the earth may remain interrupted. As soon as the reply arrives the attendant at the station from which the train is to start moves the handle D against the stud F, and thereby sends the current from the local battery through the coil H to the wire $a$; but as the handle is performing its travel to effect this action it passes the break L, whereby the alarm on the locomotive will be set going and the signal to start given. This done, the train is supposed to be in motion. Now, every time it passes one of the signal-rods $b$ its contact-springs $i$ will come in frictional contact with those rods, but its alarm $f$ will remain silent, because by this contact the currents from the positive poles of the traveling and local batteries are in communication with each other, while their negative poles communicate with earth; but if a train wishes to send alarm-signals to the station at a time when it is not passing a signal-rod, $b$, the attendant, by means of the commutator, changes the pole which communicates with the springs $i$, and then, by means of a coil of wire wound on a wood axis, brings the wire $a$ for an instant into contact with the springs $i$ and closes the circuit between the batteries, (local and traveling,) whereupon the alarm will sound and the coil of the station-instrument will attract the piece I, which being in connection with earth, it follows that when the current from the local battery which flows along the coil reaches the axis or core to which the end is soldered it passes off to earth through the piece I and ceases to flow along the wire $a$, and the wire being in connection with the armature of the coil becomes a conductor to earth of the currents from the batteries of one or more engines traveling along the line. If the train should, however, be passing a signal-rod, $b$, when it has to signal, the pole of the battery has only to be changed, as before explained, and when contact takes place between the spring and rod $b$ the same result will ensue.

The station can signal to a train traveling along the line by changing the pole of its battery or placing the signal-wire in connection with earth, so that as soon as the train comes in contact with the signal arrangements on the line its alarm will sound and the alarm will be repeated by the station-coil.

If a workman or other person at any part of the line considers it necessary to signal to a station or to a train in progress he places the signal-wire for an instant in communication with one of the rails by means of a wire on a rod, whereupon the circuit will be closed. As soon as a train arrives at one of the signal-rods the current will pass to earth along the signal-wire and the alarm will sound.

Again, suppose when two trains are traveling in one direction on the same line of rails, the front one should be thrown off the rails or otherwise stopped, it can advise the train behind it, because both trains have the same pole in communication with their contact-springs, so that if the driver or attendant on the train in front acts as if signaling to a station, the second train will be advised by its alarm sounding on its arriving at a signal-rod. Again, supposing a train in danger of collision from another approaching it on the same line of rails, and of course coming in an opposite direction to the first, the contact-current of the second train not corresponding with that flowing along the signal-wire $a$—that is, the current in the springs $i$ coming from a different pole to that whence comes the current traveling along the wire $a$—the alarm-bell of this second train will sound at the first signal-rod $b$ against which the contact-springs on its locomotive shall touch. The other train and the station also would be advised of the danger. Also, the two nearest stations may signal to each other in a similar manner to that described for signaling when starting a train.

To render the apparatus more certain of action it is recommended that previous to the train starting the station-master should (instead of the telegraph-clerk) signal to the next station, through the wire $a$, the arrival of the reply proving that the whole apparatus is in working order. Lest, before the train starts, the station-master should forget to move the handle D to the stud F to send the current to the signal-wire, this operation is rendered subsidiary to the signal for starting, for which purpose the interrupted wire L is used, so that when the handle D is moved it may effect a junction, and the locomotive alarm-bell sounding serves, instead of the signals hitherto usual, to advise the train when it is to start. The alarm $f$ sounding at this time also shows if all be in proper working order.

Having now described the nature of my invention and in what manner the same may be performed I declare that I claim—

Arranging and combining apparatus substantially as hereinbefore described.

In testimony whereof I have signed my name to this specification before two subscribing witnesses.

EUGENIO VINCENZI.

Witnesses:
    EMILE BARRAULT,
    PAUL FOUGER.